United States Patent [19]

Bergan

[11] 4,264,030
[45] Apr. 28, 1981

[54] PROCESS FOR ROLLING EDGE OF STAINLESS STEEL CLAD ALUMINUM COOKING VESSELS

[75] Inventor: Norman A. Bergan, Dallas, Tex.
[73] Assignee: Dimark, Inc., Dallas, Tex.
[21] Appl. No.: 73,023
[22] Filed: Sep. 6, 1979
[51] Int. Cl.³ .................. B23K 28/02; C23C 5/00
[52] U.S. Cl. .................................. 228/170; 29/558;
 156/216; 220/453; 228/190
[58] Field of Search ............. 228/170, 173 C, 190;
 29/423, 557–558; 220/453; 156/216

[56] References Cited
U.S. PATENT DOCUMENTS

| | | | |
|---|---|---|---|
| 1,947,843 | 2/1934 | Ganskow | 409/138 X |
| 1,981,915 | 11/1934 | Hormel et al. | 220/453 X |
| 2,576,121 | 11/1951 | Kamborian | 156/216 X |
| 3,466,736 | 9/1969 | Frye | 228/170 |
| 3,495,735 | 2/1970 | Ulam et al. | 220/453 |
| 3,636,616 | 1/1972 | Remning | 29/557 |

Primary Examiner—Kenneth J. Ramsey

[57] ABSTRACT

A process for sealing the exposed aluminum core of a workpiece formed of stainless steel clad aluminum material of the type in which sheets of stainless steel are bonded to the opposite side of an aluminum core to form a stainless steel skin on each side thereof. In the first step of the process, one side of the stainless steel skin (24) and substantially all of the aluminum core (14) are skived off below the exposed edge (22) of the workpiece along a cut (26). The cut (26) in the aluminum core is then ground into the shape of a convex meniscus (30). In the third step, the skin (24) on the skived off side, which extends above the meniscus (30), is rolled inwardly over the meniscus (30) and in the fourth step, the unskived skin (28) is rolled inwardly over the meniscus, thereby completely sealing the aluminum core.

3 Claims, 4 Drawing Figures

PROCESS FOR ROLLING EDGE OF STAINLESS STEEL CLAD ALUMINUM COOKING VESSELS

TECHNICAL FIELD

The invention relates to the manufacture of cookware or cooking vessels and more particularly to a method for enclosing the exposed aluminum edge of stainless steel clad aluminum cookware.

BACKGROUND ART

Stainless steel clad aluminum is widely used in the manufacture of cookware because of its superior thermal conductivity. In conventional processes for manufacturing cookware from stainless steel clad aluminum, the aluminum core of the material is exposed at the edge, particularly around the top edges or lip of the cooking vessel. The layer of exposed aluminum tends to oxidize which causes an unsightly appearance, and the softness of the exposed aluminum core makes it subject to pitting or other damage. This detracts from the appearance of the cookware making it somewhat undesirable as a consumer product.

Accordingly, a need arises for a method of sealing the exposed edges of stainless steel clad aluminum cookware to prevent oxidation of the aluminum.

DISCLOSURE OF THE INVENTION

In accordance with the present invention, a method is disclosed for sealing the exposed aluminum core of a workpiece formed of stainless steel clad aluminum material.

According to the first embodiment of the invention, the stainless steel skin on one side of the workpiece and the aluminum core are skived off below the exposed edge leaving the opposite skin unskived. The newly cut aluminum surface is then cut in the shape of a convex meniscus. The skin on the skived off side, which extends above the meniscus, is rolled inwardly over the meniscus and the unskived skin is then rolled inwardly over the meniscus to form a seal around the exposed aluminum core.

BRIEF DESCRIPTION OF THE DRAWINGS

A more complete understanding of the invention and its advantages will be apparent from the foregoing detailed description taken in conjunction with the accompanying drawings in which.

DETAILED DESCRIPTION

Figure 1:
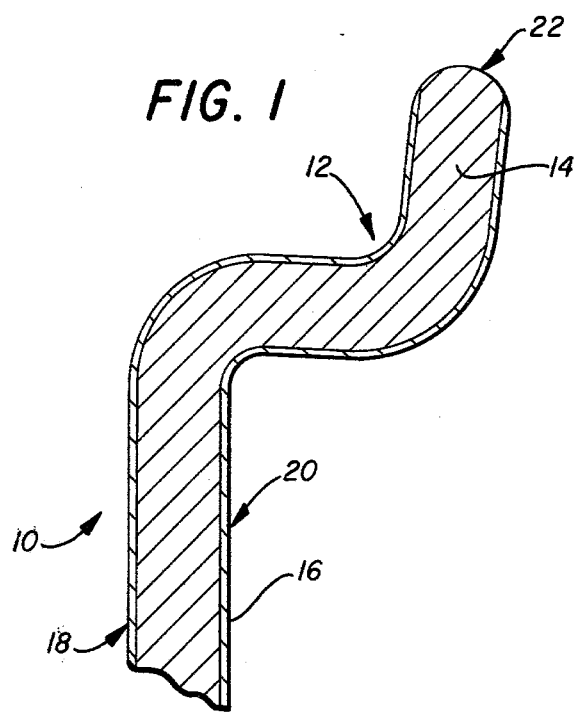
FIG. 1 is a schematic section view of a segment of stainless steel clad aluminum.
Figure 2:
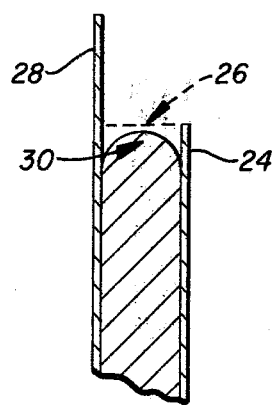
FIG. 2 is a schematic section view of the exposed aluminum showing one side of the stainless steel skin and the aluminum core skived off.
Figure 3:
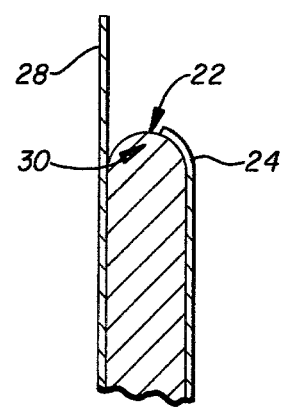
FIG. 3 is a schematic section view of the first embodiment of the invention shown in FIG. 2 in which the skin on the skived off side, which extends above the meniscus, has been rolled over the meniscus cut into the aluminum core.
Figure 4:
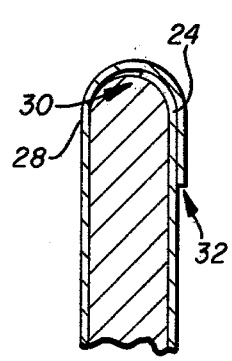
FIG. 4 is a schematic section view of the first embodiment of the invention shown in FIGS. 2 and 3 in which the unskived stainless steel skin has been rolled over the aluminum core and over the opposite skin.

The present invention relates to a process for sealing the exposed aluminum core of an item formed of stainless steel clad aluminum, such as, for example, cookware. In FIG. 1, a segment of stainless steel clad aluminum material, designated generally by the numeral 10, is shown schematically in cross section, configured to form a lip 12 as might be found on the upper edge of a conventional frying pan, skillet or pot. Segment 10 contains an aluminum core 14, to which is bonded thin sheets of stainless steel 16 typically having a thickness of about 0.015 inches. Generally the material used in such applications has a thickness varying from 0.060-0.180 inches, with the aluminum core having a thickness of 0.045-0.165 inches. When the stainless steel clad aluminum material is shaped to form a cooking vessel, as partially shown in FIG. 1, the stainless steel clad aluminum material forms an inside skin 18 and an outside skin 20 as indicated in FIGS. 1-4. As further evident in FIG. 1, the aluminum core 14 of segment 10 is exposed along the edge 22 to oxidation and damage from the environment. The invention described hereafter and illustrated in FIGS. 2-4 is directed to a method for sealing the exposed edge 22 to prevent oxidation and other damage to the cookware.

The present invention is illustrated in FIGS. 2-4, which schematically illustrate the portion of segment 10 adjacent exposed edge 22. The first step of the process is to skive off one side of the stainless steel skin 24 as well as substantially all of the aluminum core along a cut 26, sufficiently far below the exposed edge 22 so that the unskived skin 28 will extend far enough above the cut 26 to permit complete enclosure and sealing of the exposed core in the manner described hereafter. An engine lathe with a straight cutting tool shaped so as to cut a crescent is next applied to the cut 26 to form a meniscus 30 shown in FIGS. 2 and 3. The skin 24 on the skived side, which extends above the meniscus 30, is next rolled inwardly over the meniscus into contact therewith as shown in FIG. 3 by application of a conventional roller. In the next step, the roller is applied to the unskived skin 28 such that it is rolled inwardly into contact with the meniscus, overlapping skin 24, and is pressed into contact with skin 24 as best seen in FIG. 4. As a final finishing step, the unskived skin 28 may be welded to the skin on the skived off side, at 32, as shown in FIG. 4, although such treatment is not essential. In this manner the exposed edge is completely sealed from oxidation and damage from the environment and by thus finishing stainless steel cookware, its appearance and marketability can be greatly enhanced. Normally, the outside skin 20 (FIG. 1) will be skived off so that the inside skin (18) is rolled over the edge 22 and the seal is completed on the outside of the vessel. However, it is immaterial which skin is skived off for purposes of the present invention and the seal may be completed on the inside of the vessel.

Although particular embodiments of the invention have been illustrated in the drawings and described herein, it will be understood that the invention is not limited to the embodiments disclosed, but is capable of rearrangement, modification and substitution of parts and elements without departing from the spirit of the invention.

I claim:

1. A process for sealing the exposed edge of a workpiece made of stainless steel clad aluminum material of the type in which sheets of stainless steel are bonded to opposite sides of an aluminum core to form a stainless steel skin on each side thereof, the steps comprising:

skiving off one side of the stainless steel skin of the workpiece and substantially all of the aluminum core along a cut below the exposed edge of the workpiece, leaving the opposite skin unskived;

cutting a meniscus into the cut in the aluminum between the unskived skin and the skin on the skived off side;

rolling the skin on the skived off side over the meniscus; and rolling the unskived skin over the meniscus to seal the exposed aluminum core.

2. The process of claim 1 further comprising the step of seam welding the unskived skin to the skin on the skived off side.

3. The process of claim 1 wherein one side of the stainless steel skin and the aluminum core are skived off sufficiently far below the exposed edge of the core such that the unskived skin extends far enough above the cut to completely cover the aluminum core when rolled over the meniscus.

* * * * *